United States Patent [19]

Watts

[11] Patent Number: 5,018,771
[45] Date of Patent: May 28, 1991

[54] THREADED TUBULAR CONNECTION

[76] Inventor: John D. Watts, P.O. Box 79466, Houston, Tex. 77279

[21] Appl. No.: 315,271

[22] Filed: Feb. 24, 1989

Related U.S. Application Data

[63] Continuation-in-part of Ser. No. 897,069, Jul. 18, 1986, Pat. No. 4,813,717.

[51] Int. Cl.$^5$ .............................................. F16L 25/00
[52] U.S. Cl. ..................................... 285/333; 285/397
[58] Field of Search ................. 285/333, 334, 355, 397

[56] References Cited

U.S. PATENT DOCUMENTS

| | | | |
|---|---|---|---|
| 2,051,499 | 8/1936 | Siegle | 285/333 |
| 2,196,966 | 4/1940 | Hammer | 285/333 |
| 2,508,306 | 5/1950 | Thurston et al. | 285/333 X |
| 2,535,435 | 12/1950 | Massey | 285/333 X |
| 4,429,904 | 2/1984 | Reimert | 285/334 X |
| 4,717,183 | 1/1988 | Nobileau | 285/355 X |
| 4,796,923 | 1/1989 | Liggins | 285/334 X |
| 4,813,717 | 3/1989 | Watts | 285/333 |

*Primary Examiner*—Dave W. Arola

[57] ABSTRACT

A tapered threaded tubular connection is depicted (20) that is formed and dimensioned so as to prevent cross-threading of pin 4 with box 7 when at stab position as at 54 of FIG. 5. As shown in FIG. 6, the stab depth is sufficiently great such that pin and box thread crests contact as at (47) to thereby limit angular mis-alignment to be less than the angular mis-alignment required to permit pin thread crest (55) to pass box thread crest (56) which is it did pass, would effect cross-threading of the connection.

12 Claims, 3 Drawing Sheets

THREADED TUBULAR CONNECTION

This application is a continuation-in-part of prior application Ser. No. 897,069 filed July 18, 1986 now U.S. Pat. No. 4,813,717 issued Mar. 21, 1989, which is a continuation of PCT/US85/0260 filed Feb. 19, 1985 now abandoned, which is a continuation-in-part of PCT/US84/1936 filed Nov. 23, 1984 now abandoned.

TECHNICAL FIELD

The outer diameters of conventional threaded pipe couplings are substantially greater than the outer diameter of the pipe joints that they connect and the same is true for most strings of casing and tubing installed within oilwells, however, several constraints are persented by oilwells that are not normally present in surface piping systems. Each consecutive string including couplings, must pass within a hole bore diameter established by a drill or by a previously set string of pipe. Additionally, there mustbe sufficient clearance between that bore and the maximum diameter of the string being run so as to lower freely without sticking and to allow sufficient flow area through the annulus then formed for fluids without causing an unacceptable pressure drop caused by friction of the flowing fluid. Thirdly, oilwell strings must withstand axial tension and compression loads caused by the weight of miles of pipe that may be hanging within the well. Further, oilwell strings may be subject to external fluid pressures being greater than internal pressures to thereby introduce tendency to collapse. For these and other reasons, joints with upset ends and high cost "premium connections" have been introduced to work in the presence of such constraints. However, such solutions result with the outer diameters of connections being greater than the outer diameter of the pipe joints that they connect. There do exist, connections for pipe not having upset ends wherein one end of a joint is threaded externally and the other end is threaded with a mating internal thread such that joints can be screwed together to result in a connection with an outer diameter no larger than the pipe mid-section. However, such joints, such as Hydril FJ Premium tubing connections enjoy only 42% axial tension strength as compared to the unthreaded pipe wall, about the same as non-upset API tubing connections. Presently, due to diameter constraints a typical oilwell pipe program may be: 5¼ OD×2⅜ OD×1.6 OD. To be far more advantageous, a 2⅜ OD×1.6 OD×1.05 OD can often make an installation possible due to clearance or cost reasons that the typical program above could not and in every case, a less expensive and a more efficient installation should result. Many tons of steel per oilwell may therefore be saved from waste. When a pipe having no reduced wall thickness contains fluid pressure, the axial stress within that wall caused by fluid pressure is approximately one-half of the circumferential stress within that wall caused by the same pressure and therefore a like amount of mechanical axial stress may be applied by pipe weight or the like, without the axial stress exceeding the circumferential stress. Reduction of the pipe wall thickness as by a thread formed on a joint of non-upset pipe, will therefore reduce still further, the magnitude of axial stress that may be dedicated to support the pipe weight.

There is therefore a substantial need for a flush joint tubular connection having a higher efficiency with no loss of the connections ability to seal against fluid pressure.

For assembly of conventional threaded connections, the external thread must be carefully aligned both axially and angularly, with the internal thread before stabbing so as to prevent cross-threading of the connection. It is then moved axially to contact the end thread of the pin with a thread of the box to thereby effect stab position. The length of the pin thread that then projects into the box thread if any, is known as stab depth. Then, while being careful to maintain said alignment, the pin is rotated into the box by hand to a "hand-tight" position after which, a wrench is used to tighten the pin to a position of full makeup. The accuracy of stabbing often determines the effect of the connection. Connections that have been cross-threaded usually leak even after dissembly and proper makeup. Connections that are put into service in a cross-threaded condition will not only leak but will rupture at a small fraction of the rated load. It is therefore clear that a connection designed to prevent cross-threading is highly desireably to eliminate the danger and damage that can be caused by such leakage and rupture.

BACKGROUND ART

A flush joint tubular connection has inner and outer diameters substantially the same as the tubing joints which the connection connects.

A flush joint tubular connection made by the Hydril Company and covered by numerous patents comprise a first straight thread, a second straight thread of sufficient diameter to pass within the bore of the first thread and a tapered mating seal between the two joints of tubing which is a premium joint of high cost and according to published data, enjoys only 42% axial strength with regard to the pipe wall.

Standard A.P.I. non-upset tubing connections comprise couplings having outer diameters considerably larger than the pipe outer diameter but still only enjoy approximately 42% efficiency as above. A.P.I. does list a "turned down" collar outer diameter to increase clearance between strings, however, the "turned down" diameter still exceeds substantially, the pipe outer diameter.

No prior art discloses a flush joint tubular connection having tapered threads, that when properly assembled, effects optimum stresses within the small end of the external thread and within the large end of the internal thread so as to provide a connection of maximum efficiency. Conventional pipe connections have threads with like tapers and result in a constant diametrical interferance along the taper between the external and internal threads, thereby causing excessive stresses or requiring increased wall thickness at the end of the pipe. Excessive stresses reduce the joint strength and an increased wall thickness rules out a flush joint connection.

It is therefore clear that a flush joint connection having a high efficiency as provided by the instant invention is nedded for use within oilwells and other pipe assemblies wherein radial clearance is limited.

Standard pipe threads as well as A.P.I. threaded connections have such a tendency to cross-thread that "stabbing guides" are often used at a considerable cost of time and expense. Such threads have an extremely shallow stab depth and a relatively large thread depth, both of which add to the cross-thread problem. Perfect alignment is difficult to attain under normal field conditions and often impossible to attain under difficult conditions. Premium connections such as disclosed by Stone in U.S. Pat. No. 1,932,427 require even closer alignment to stab because of the close fit of straight threads and the "pin nose" seal 32 which is highly suseptable to damage. To applicant's belief no prior art comprises the combination of a deep stab, thread height and thread diameter as required to provide a tapered threaded connection that will stab easily and quickly without the possibility of cross-threading. By way of an example, a 2⅜ EU 8rd A.P.I. tubing thread has a 2.473" pin end diameter and a 2.437" box bore at the first thread which allows no entry of the pin into the box at stab position. The counterbore of the box allows entry of the pin only 0.446" affording at best, axial alignment but no angular alignment so less than six degrees of angular misalignment will allow it to cross-thread.

About 1940, A.P.I. changed from 10 V threads to 8rd and a substantial improvement resulted because less gauling occurred during makeup of the threads. It was then commonly assummed "that any thread finner than 8 threads per inch would gaul and cross-thread" and that myth persists today. However, the improvement resulted almost entirely from the better thread form, eliminating the sharp egded V threads. The present invention with threads as fine as 20 per inch, run fast and smooth without cross-threading, and it has other features as well.

DISCLOSURE OF INVENTION

The present invention provides a connection for non-upset joints of oilwell tubing or the like, having a tubular coupling formed with tapered external threads thereon for mating with tapered internal threads formed within the ends of the non-upset tubing joints to be connected.

The coupling may be formed of a material having a higher strength than the material from which the tubing joints are formed so as to allow higher circumferential stresses within the small end of the male threads which is of a thinner wall than the tubing wall thereby adjacent, so as to provide a higher sealing force between the mating threads in the primary seal area. The use of higher strength material for the coupling also provides a higher axial load capacity than would be provided should the male thread be formed on the tubing joint and increases wear life due to the higher hardness.

So as to avoid the pullout tendency inherent in a non-upset tubing thread having conventional 60° thread flanks with respect to the tubing axis, a thread form is provided that has a load bearing flank angle of 75° or more, the optimum angle depending on such factors as the pipe diameter, the wall thickness and the material strength.

As taught by my series of patents beginning with U.S. Pat. No. 2,766,829 which have enjoyed worldwide commercial success for over 30 years in the oilfield, the space industry and the nuclear industry, the taper of the external thread is formed at a lesser angle than the taper of the internal thread so as to ensure a maximum primary sealing tendency at the smallest possible pressure area so as to minimize the axial load imposed on the connection due to internal fluid pressure. The present invention utilizes this feature in combination with other features.

Accordingly, initial thread engagement occurs on the external thread at the small end only, simultaneously as a radially spaced relationship exists between the internal and external threads elsewhere. As the connection is tightened toward full makeup, thread contact increases progressively from the small end toward the end of the tubing joint. The threads may be dimensioned such that at full make up, the threads at the larger end are in contact and the circumferential stresses within the tubing joint are less than the circumferential stresses within the small end of the male thread, ideally in proportion to their respective yield strengths.

The use of flank angles that reduce pullout tendency also allows the use of shallower threads such as a thread depth of 0.030" instead of thread depths as used by A.P.I., i.e., 0.0556" for 10 round threads and 0.0712" for 8 round threads for conventional tubing connections. In turn, the shallower thread depth allows for a higher connection efficiency because a smaller portion of the coupling wall is removed to form the thread and thereby, a thinner coupling wall may be used which, in turn, improves radial clearance of the connection and, in turn, makes possible a high efficiency flush joint connection.

So as to preclude excessive circumferential stresses of one cooperating threaded member before full makeup of the two, the wall thickness of the two near the small end of the engaged threads may be dimensioned inversely proportional to the strengths of the materials of each. Since moduli of elasticity is substantially the same for both members, both members will therefore be stressed to substantially the same percentage of their respective material strengths.

Should the innermost diameter of the connector be of prime importance, the coupling bore may be dimensioned slightly larger than the standard drift diameter for that size tubing, to result in a short coupling as may provide, for instance, a 75% connector efficiency. However, should axial joint strength be of prime importance, the coupling bore may be dimensioned slightly smaller than the standard drift diameter, to result in a long coupling as may provide a connector of 95 to 100% efficiency. The internal thread within the tubing joint may be formed of sufficient dimension to receive either coupling to thereby add versatility by selection of couplings at the time of use. For instance: short couplings may be used in the lower portion of a string so as to provide maximum internal clearance and thereby reduce flow resistance; long couplings may be used in the upper portion of a string so as to provide greater axial strength as required by higher axial loads due to weight of the string; all with use of like tubing joints.

The coupling may be provided with a shoulder to abut the end of the tubing joint upon full makeup, should conditions require precise makeup lengths, higher torque capacity or greater bending strengths.

The present invention prevents cross-threading during make-up of the connection by providing the combination of a stab depth, a thread diameter and a thread form dimensioned for a tapered threaded connection such that the maximum angle of misalignment that is possible at stab position is less than the minimum angle at which cross-threading can occur. The tendency to cross-thread decreases as: the stab depth increases; the thread height decreases; the thread diameter decreases; the axial thread pitch increases; the crest width decreases. At stab position, the stab flank of the pin thread of smallest diameter will contact a stab flank of the box around the circumference of said pin thread. The stab depth is interdependent on the box thread bore at face of the box, the pin end thread diameter and the taper of the box thread. The diameter of the threads are often limited by constraints such as the tubular wall thickness and therefore, an accurate workable combination of these factors must be determined. When at stab position, the minimum angle at which cross-threading can occur is substantially equal to:

Arctangent $((P-2C)/D)$, where:
P = axial thread pitch.
D = outside diameter of smallest pin thread.
C = average width or average radius of crests.

The maximum angle of mis-alignment that can occur when at stab position is substantially equal to:

Arctan$((H+G)/S)$, where:
H = height of thread form per side.
S = stab depth of pin into box thread.
G = radial gap between the internal thread of largest diameter and the radially adjacent external thread crest when at stab position. If pin and box tapers are equal then G=0.

Setting the angles equal and rearranging, defines the minimum stab depth for a given combination of D,H,G,P and C that is required to prevent cross-threading of the connection. $S \geq D(H+G)/(P-2C)$ To serve different conditions, various combinations may be used but any such combination that comprise a stab depth equal to or greater than S as defined above, is in accord with the present invention.

DETAILED DESCRIPTION OF THE INVENTION

Figure 1:
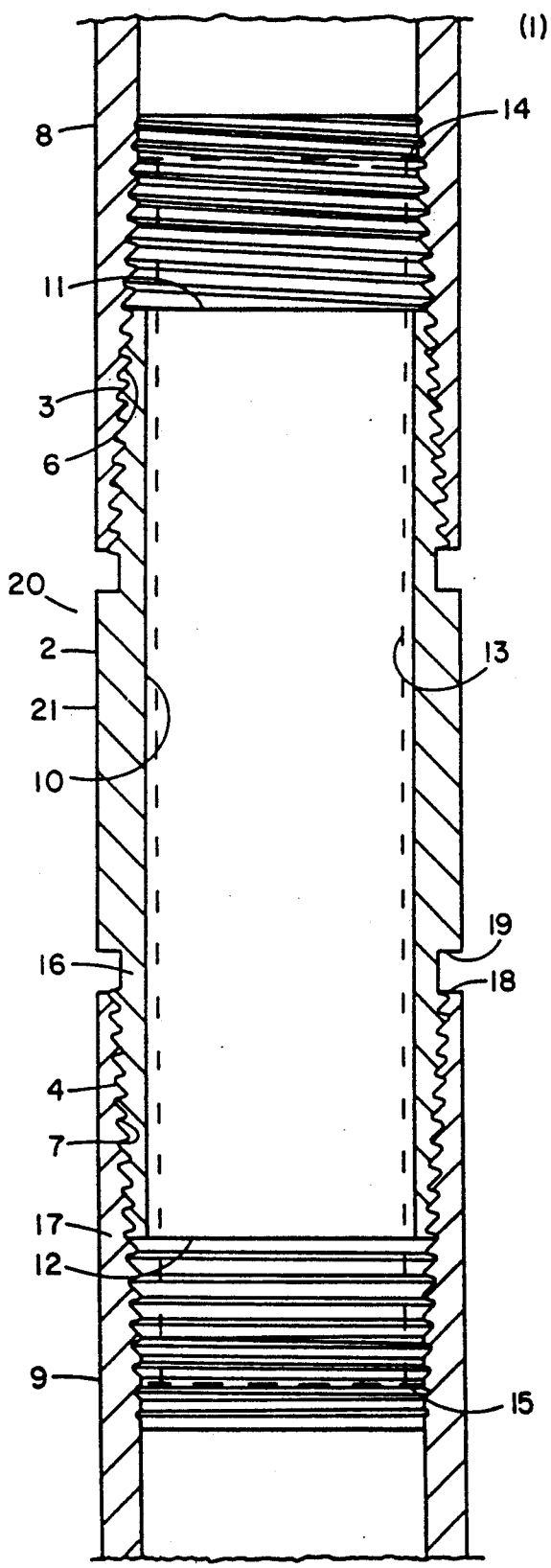
FIG. 1 depicts a vertical section of a connector in accord with the present invention.

FIG. 1 depicts tubular connection shown generally at 20 comprising coupling 2 with tapered external threads 3 formed on an upper portion and having like threads 4 formed on a lower portion, so as to mate in sealing engagement with tapered internal threads 6 and 7 formed within joints of non-upset tubing 8 and 9 respectively, to be connected.

Coupling 2 may comprise inner diameter 10, upper end surface 11 and lower end surface 12, said end surfaces not extending for the full length of internal threads 6 and 7, when it is desired to have a connection with an inner diameter that will pass the industry standard "drift bar" for that size tubing. Such a connection, as limited by the tension area resulting between the root diameter of the last engaged thread as at 12, and the tubing outer diameter, may provide an axial tension strength in excess of three fourths of the pipe wall strength, effecting an efficiency greater than 75%.

Should a connection having a still higher axial strength be required, coupling 2 may be formed with inner diameter as at 13, upper end surface as at 14 and lower end surface as at 15. The coupling thereby extending for substantially the full effective length of the internal threads so as to provide a connection having an axial strength substantially equal to the pipe wall strength to thereby approach 100% efficiency.

Figure 3:
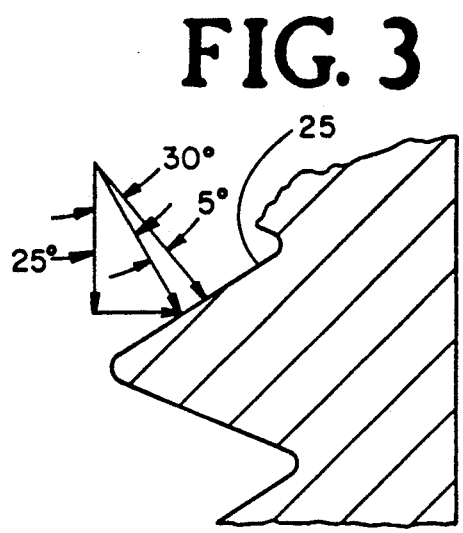
FIG. 3 illustrates a thread form in accord with conventional tubing joint threads.
Figure 2:
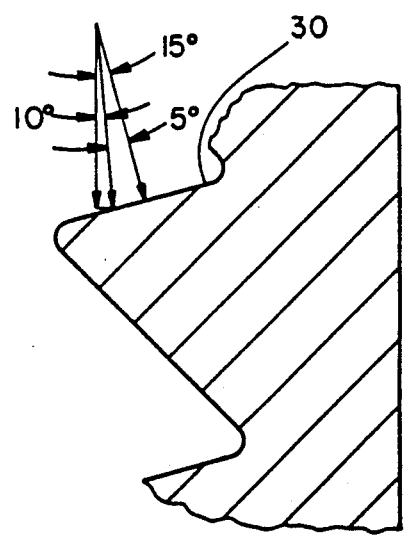
FIG. 2 illustrates a thread form in accord with the present invention.

Since typical tubing joints have lengths of sixty times or more the lengths of couplings that connect them, the couplings may be formed of material much stronger than the material the joints are formed of without causing significant increase of cost for the entire string. The use of higher strength material for the coupling 2 makes possible a higher axial strength for the connection 20 because, the strength of the coupling at neck section 16 is increased and because, collapse resistance of the pipe end as at 12 is increased to thereby increase the pullout strength also. To further increase the pullout strength of the connection, a thread form having a load bearing flank formed at 75° with respect to the tubing axis as depicted in FIG. 2, may be used for the mating threads as opposed to the most common thread form used on oilwell tubulars, depicted in FIG. 3. The form of FIG. 3 has a loadbearing flank 25 which effects an angle of 60° with the tubing axis 24. Assuming an angle of friction of 5°, elementary vector analysis will show that the form depicted in FIG. 2 results in a pullout strength of $2\frac{1}{4}$ times that of FIG. 3. Reduction of the flank angle still further, can virtually eliminate tendency to pullout.

So as to ensure a seal diameter for the connection of least diameter and therefore the least axial fluid load, the taper of the external thread may be made slightly less than the taper of the internal thread. Such a condition also allows maximum radial compression of the coupling as at end surface 12 adjacent pipe joint wall as at 17 which may be formed thicker than the adjacent coupling wall. Thus, upon makeup, end 12 will compress more than wall 17 expands due to the difference in thicknesses, the moduli of elasticity being considered substantially the same. Since coupling 2 may be made of higher strength material than tubing joints 8 or 9, the thickness may be dimensioned such that stresses in walls at 12 and 17 are substantially at the same percentage of the yield strength of the materials of which the members are formed.

When the taper of the external thread is made less than the taper of the internal thread, initial contact between the two occurs only at the small end as at 12 with the internal thread as at 17. Upon continued makeup, thread contact progresses toward the larger end of the tapers to cause full engagement of the threads as at 18. A slight amount of further makeup may cause a predetermined magnitude of circumferential stress within the end of the tubing joint as at 18 and thereby establish a position of full makeup, so as to cause: compressive circumferential stresses within end 12 to be at a first desired value, simultaneously with tension circumferential stresses within the tubing joint wall between 17 and 18 being at a second desired value, less in magnitude than said first value. Said desired values may be set at the same percentage of the unit yield strengths of the respective materials to thereby effect a maximum strength for the connection.

So as to substantially effect the desired stress values, I have developed the following formulas for a given set of conditions, as an example:

$FT\#$ Hand Tite Torque = $14.5 \, (W \, D)^{\frac{1}{2}}$

Additional Power Tite Turns = $PDY/3700$

Initial Taper of External
Thread = $T - (18DY/EL)$ = inches/ft. on dia.

where:
W = pipe wall thickness, inches
D = pipe outside diameter, inches
Y = pipe unit yield strength, psi
Coupling Unit Yield Strength = 1.45 Pipe Unit Yield Strength
T = Initial internal thread taper inches/ft. on dia.
L = length of thread engagement, inches
P = thread lead, inches
E = modulas of elasticity Connection 20 may comprise shoulder 18 formed on the end of joint 9 and shoulder 19 formed on coupling 2 intermediate thread 4 and the outer diameter 21 of coupling 2. The mating threads may be dimensioned so as to makeup as shown in FIG. 1 or should greater bending strength or greater tortional strength be desired, the mating threads may be dimensioned and given closer tolerances so as to allow shoulders 18 and 19 to abut upon makeup.

Figure 5:
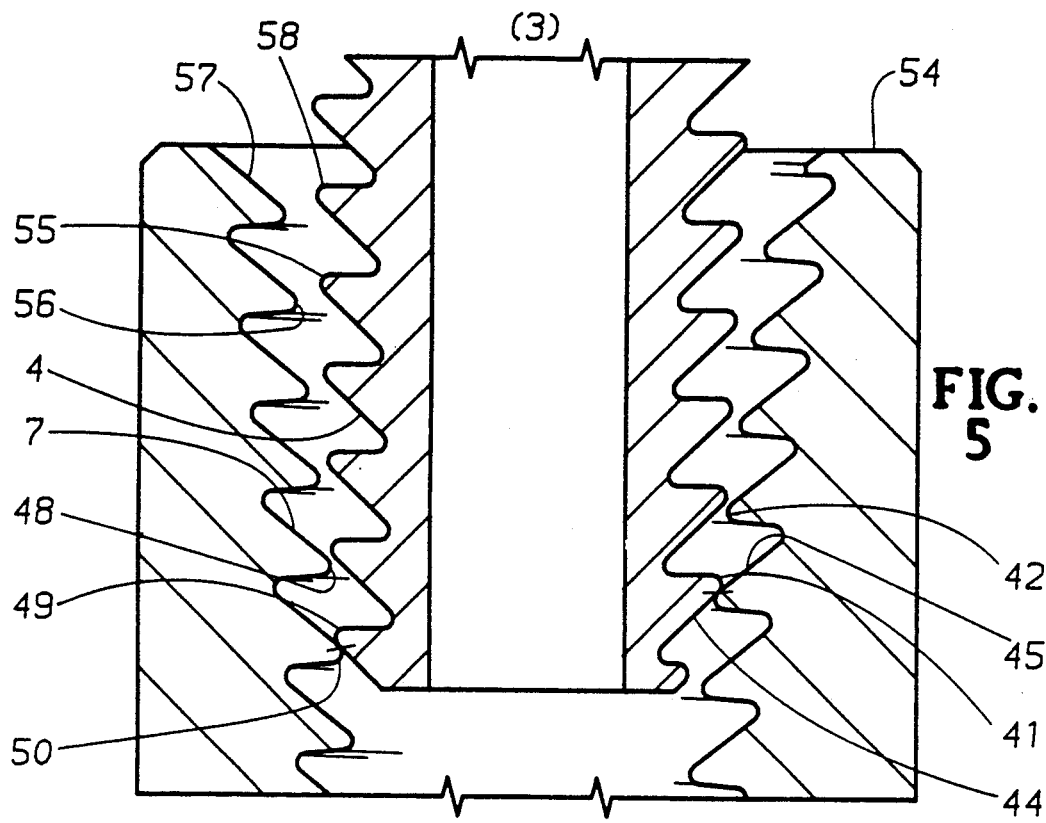
FIG. 5 depicts an embodiment of the present invention at stab position, aligned both axially and angularly.
Figure 6:
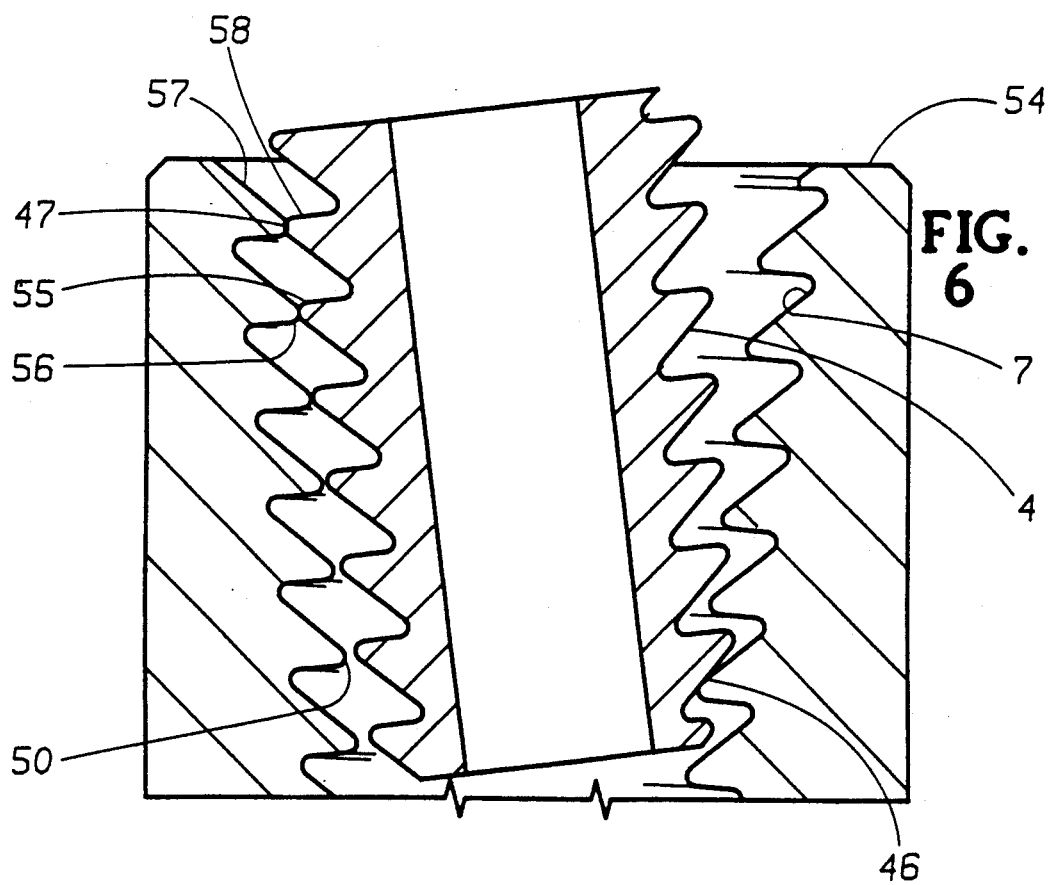
FIG. 6 depicts an embodiment of the present invention at stab position with angular mis-alignment between the axis of the pin with respect to the axis of the box.

FIG. 5 illustrates the pin and box in stab position wherein diameter 41-49 of the pin thread of smallest diameter has passed axially through box threads of larger diameter 42-48 until a box thread that has a crest diameter 50-41, that is smaller than 42-48 is reached whereupon, pin stab flank 44 contacts box stab flank 45 around the circumference thereof and thereby establishes stab position and defines stab depth as the axial distance 50-54. While some portion of flanks 44 and 45 are held in contact with each other as at 46, a limited degree of angular mis-alignment as shown in FIG. 6, is possible between the axis of pin thread 4 and box thread 7, being limited by contact of box thread of largest diameter 57 with radially adjacent pin thread 58, on the other side of the tubular axis from point 46. It is now clear that as said mis-alignment occurs, pin thread crest point 55 will move toward box thread crest point 56 and should the limit of mis-alignment not occur before crest point 55 passes 56 then cross-threading may occur as the pin is rotated into the box in an attempt to effect full makeup. In FIG. 6 the crests of threads 57 and 58 are drawn as if they overlap as at 47 so as to show crest points 55 and 56 at the minimum angle at which cross-threading can occur. However, such overlapping would not occur because the contact of threads 57 and 58 would limit the angle of mis-alignment to a smaller angle than is depicted in FIG. 6 and therefore, point 55 could not pass point 56. Thus it is clear that at a stab depth of less than 50-54 as shown in FIG. 5, the connection can cross-thread. Conversely, at a stab depth of 50-54 or greater, the connection will be in accord with the present invention and it will not cross-thread.

Figure 4:
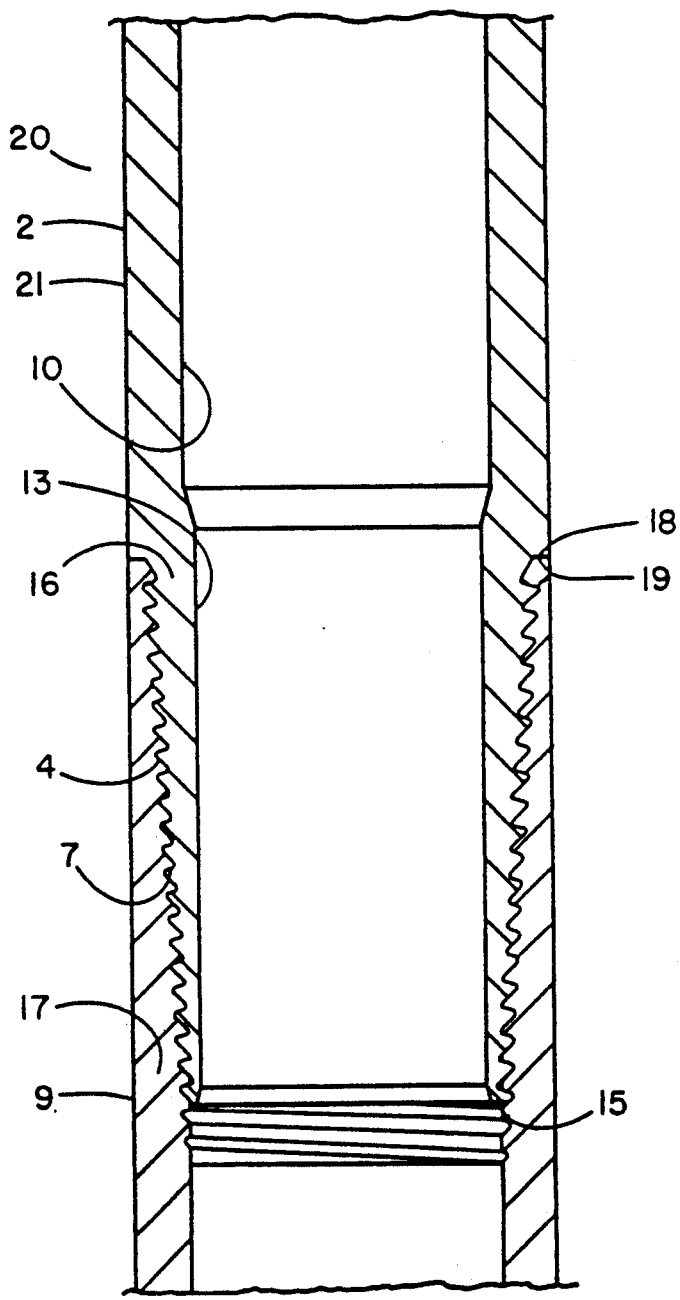
FIG. 4 depicts an embodiment of the present invention that provides shoulder abutment upon make-up of the connection.

The stab flanks of the preferred embodiment are shown formed at 45 degrees which facilitates make-up of the connection because the 45 degrees automatically centers the pin with the box upon contact of flanks 44 with 45, however, other embodiments of my invention may comprise other thread forms. FIG. 4 depicts a preferred bore configuration for the pin which can include minimum bore diameter extending to the pin neck as at 51 and an outwardly tapering bore extending therefrom to the pin end as at 53 which is sufficiently larger than bore 51 so as not to restrict bore 51 upon contraction of bore 53 upon make-up of the connection.

I claim:

1. A threaded connection having a first member formed with tapered internal threads and a second member having tapered external threads dimensioned and formed for cooperation with the internal threads such that the external threads may be positioned axially within the internal threads to a stab depth that is established when the external thread of smallest diameter contacts an internal thread around the circumference of the external thread of smallest diameter, the stab depth exceeds the quantity: the thread form height plus the thread gap, multiplied by the outer diameter of said external thread and then divided by the difference of, the axial pitch of the threads minus twice the average width of the thread crests.

2. A threaded connection having a first tubular member formed with tapered internal threads and a second tubular member having tapered external threads dimensioned and formed for cooperation with the internal threads so as to securely fasten the members together, such that the external threads may be positioned axially within the internal threads to stab depth such that when one member is axially misaligned with the other to the degree that contact between the internal threads and the external threads limit further misalignment, comprising: the thread form, the thread diameter, the stab depth, the thread pitch and the thread taper being dimensioned so as to preclude the crest of the external thread of smallest diameter being axially misaligned far enough to be positioned radially adjacent the crest of said next larger internal thread wherein the thread form comprises a stabl flank formed at an angle greater than 30 degrees with respect to the tubular axis.

3. The invention of claim 2 wherein: the first tubular member is a joint of pipe formed with tapered internal threads at both ends; the second tubular member is a coupling formed at both ends with tapered external threads.

4. The connection of claim 1 or 2 wherein the thread form comprises: a load flank formed at an angle with respect to the tubular axis, greater than the angle at which a stab flank is formed with respect to the tubular axis.

5. The connection of claim 4 further comprising: the stab flank and the load flank being joined at the crests by a first radius and at the roots by a second radius.

6. The connection of claim 5 further comprising: the first radius being substantially equal in dimension to one-tenth of the axial thread pitch; the second radius being of smaller dimension than the first radius.

7. The connection of claim 1 or 2 wherein the thread form comprises: a load flank formed at an angle of at least 75 degrees with respect to the tubular axis.

8. The connection of claim 1 or 2 wherein the thread form comprises: a stab flank formed at an angle of 45 degrees with respect to the tubular axis.

9. The connection of claim 1 or 2 wherein the thread form comprises: a load flank being formed at an angle of 83 degrees with respect to the tubular axis; a stab flank being formed at a 45 degree angle with respect to the tubular axis.

10. The connection of claim 9 further comprising: the stab flank and the load flank being joined at the crest by a first radius substantially equal in dimension to one-tenth of the axial thread pitch and joined at the root by a second radius of smaller dimension than the first radius.

11. The connection of claim 1 or 2 wherein the thread form comprises: a load flank being formed at an angle of 90 degrees with respect to the tubular axis; a stab flank being formed at an angle of 45 degrees with respect to the tubular axis.

12. The connection of claim 11 further comprising the stab flank and the load flank being joined at the crest by a first radius substantially equal in dimension to one-tenth of the axial thread pitch and joined at the root by a second radius of smaller dimension than the first radius.

* * * * *